United States Patent
Everson, Jr. et al.

(10) Patent No.: US 6,167,756 B1
(45) Date of Patent: Jan. 2, 2001

(54) PIVOTAL FLOAT FOR LIQUID LEVEL DETECTION APPARATUS

(75) Inventors: Harold William Everson, Jr., Rochester; Anthony L. Jenkins, Clawson, both of MI (US)

(73) Assignee: Patriot Sensors & Controls, Inc., Clawson, MI (US)

( * ) Notice: Under 35 U.S.C. 154(b), the term of this patent shall be extended for 0 days.

(21) Appl. No.: 09/032,967

(22) Filed: Mar. 2, 1998

(51) Int. Cl.[7] ............................. G01F 23/30; G01F 23/76
(52) U.S. Cl. ................. 73/314; 73/315; 73/305; 73/322.5; 137/206; 137/207
(58) Field of Search ............................. 73/314, 315, 305, 73/322.5; 137/206, 207

(56) References Cited

U.S. PATENT DOCUMENTS

| | | |
|---|---|---|
| 4,678,993 | 7/1987 | Vinnemann et al. . |
| 4,823,827 * | 4/1989 | Olejak ........................................ 137/2 |
| 4,939,457 | 7/1990 | Tellerman . |
| 4,943,773 | 7/1990 | Koski et al. . |
| 4,958,332 | 9/1990 | Tellerman . |
| 5,017,867 | 5/1991 | Dumais et al. . |
| 5,050,430 | 9/1991 | Begin et al. . |
| 5,076,100 | 12/1991 | Hunter et al. . |
| 5,095,933 * | 3/1992 | Olejak ................................ 137/207 |
| 5,136,884 | 8/1992 | Lovett . |
| 5,196,791 | 3/1993 | Dumais . |
| 5,258,707 | 11/1993 | Begin et al. . |
| 5,274,328 | 12/1993 | Begin et al. . |
| 5,313,160 | 5/1994 | Gloden et al. . |
| 5,406,200 | 4/1995 | Begin et al. . |
| 5,412,316 | 5/1995 | Dumais et al. . |
| 5,473,245 | 12/1995 | Silvus, Jr. et al. . |

\* cited by examiner

*Primary Examiner*—Hezron Williams
*Assistant Examiner*—Dennis Loo
(74) *Attorney, Agent, or Firm*—Young & Basile, P.C.

(57) ABSTRACT

A float for a liquid level detection apparatus including a tube extendable through liquid in a tank. The float is a buoyant body slidably mounted about the tube and having a diameter passable through an aperture in the tank. The float is preferably formed of two separate bodies joined by spacers positioned to allow the body to pivot from a first position substantially axially in line with the tube for insertion and removal of the float with respect to the tank to a second position substantially perpendicular to the tube in operative floating engagement with the liquid surface in the tank. The spacers, in one embodiment, are in the form of pins arranged in pairs along opposite side edges of the two bodies and spaced apart along the length of the two bodies such that the innermost pins of the two pairs of pins define an aperture for mounting the bodies transversely about the tube in the second, floating position. A pin is mounted along one side edge of at least one of the bodies and is engagable with a hook inserted through the aperture in the tank to pivot the float to the first position for sliding removal from the tank.

19 Claims, 4 Drawing Sheets

PIVOTAL FLOAT FOR LIQUID LEVEL DETECTION APPARATUS

BACKGROUND OF THE INVENTION

1. Field of the Invention

The present invention relates, in general, to liquid level detection apparatus and, more specifically, to magnetostrictive position transducers.

2. Description of the Art

The phenomenon of magnetostriction has been widely employed in linear distance and position measuring devices. A magnet located near or around a magnetostrictive wire marks the location to be measured. Such devices can operate with either mechanical or electrical excitation. When an acoustical/mechanical strain propagating along the wire reaches the area of influence of the magnet, an electrical signal is generated in the wire. Conversely, when an electrical signal propagating along the wire reaches the area of influence of the magnet, a torsional strain is generated in the wire.

Such linear position detectors using a magnet mounted in a float have been utilized as liquid level detectors to provide an indication of a level of liquid within a tank, such as an underground tank. The position of the magnet, and hence, the liquid level, is determined as a function of the time required for a torsional disturbance to propagate from one end of the wire through the area of influence of the magnet, in the case of mechanical excitation, or from the position of the magnet to a sensing apparatus located at one end of the wire in the case of electrical excitation.

Other types of magnetostrictive position measuring devices utilize a reflective termination at the foot end of the magnetostrictive wire. Such devices measure the difference between the propagation times of a pulse from the magnet position to the foot of the wire and reflected back to the head of the device and a pulse traveling on the wire directly from the magnet to the head.

As shown in U.S. Pat. Nos. 4,839,590; 5,017,867; 5,050,430; and 5,253,521, all of which are assigned to the assignee of the present invention, such magnetostrictive devices include an elongated, small diameter tube, typically made of stainless steel, on which a movable magnet is mounted for providing an indication of a liquid level. An enlarged head and cap are mounted on one end of the tube, typically above the liquid level and enclose electronic components, such as terminal connections and a signal conditioning circuit used to supply or output signals to and from the magnetostrictive wire in the tube. As shown in these prior art patents, the head has a considerably larger diameter than the diameter of the elongated tube extending through the tank.

Fluid tanks, such as underground gasoline or fuel tanks, are typically provided with one or more risers or hollow conduits mounted on a top surface of the tank and extending upward to an upper end which is located at ground level. One riser is usually employed for filling the tank and typically will have a diameter of approximately four inches. A second smaller riser, such as a two inch diameter riser, may also be provided as a vent.

Existing tanks which are buried underground and which were not provided with the expectation of using liquid level detection within the tank, typically will not have a large riser or a riser dedicated to liquid level detection. Thus, where it is desirable to provide liquid level detection to such existing underground tanks, previously devised magnetostrictive positioning measuring devices having an enlarged head cannot fit within the fill nozzle of the existing riser on such tanks or will completely fill the interior of the riser thereby preventing the insertion of a fuel nozzle into the riser. The only recourse in such situations is to dig up the existing tank and add a riser specifically for a liquid level detection apparatus.

One attempt to overcome these problems is disclosed in U.S. patent application Ser. No. 08/848,891, entitled "Self-Contained Liquid Level Detection Apparatus", and assigned to the same assignee as the present invention. The liquid level detection apparatus disclosed in this application has all of the liquid level detection components contained completely within a small diameter outer tube. This enables the small diameter tube to be mounted through a small diameter riser of a liquid tank, including risers or even apertures of relatively small diameter, such as a two inch diameter riser.

However, a problem still exists with respect to the float carrying the magnet which interacts with the magnetostrictive wire contained within the outer tube. It is known that the greater the amount of surface area of a float in contact with a liquid surface creates greater buoyancy due to the larger surface area displaced by the float. When a smaller amount of surface area of a float in contact with a liquid surface creates bobbing and erratic movements which, in a liquid level detector, can cause erroneous level measurements.

With tanks having risers with an inner diameter of approximately 4 inches a float with a diameter of slightly less than 4 inches can be inserted along the tube into the interior of the tank. This diameter float has proved to be sufficient in terms of having adequate buoyancy to minimize bobbing or erratic movements on the liquid surface.

However, with smaller diameter risers or apertures in older tanks, such as risers or apertures having a 2 inches inner diameter, only a float having a diameter of slightly less than 2 inches can be inserted through the riser or aperture. This size float displaces less surface area and thereby has less buoyancy which causes it to bob and introduce undesirable error into liquid level measurement.

Thus, it would be desirable to provide a float for a liquid level detection apparatus and, more specifically, a magnetostrictive waveguide liquid level detection apparatus which is capable of being inserted along the liquid level detection pipe through any size riser or aperture in a tank while still having sufficient buoyancy when in contact with the liquid surface to minimize bobbing or erratic movements on the liquid surface. It would also be desirable to provide a float for a liquid level detection apparatus which can easily fit into small diameter pipes of approximately two inch diameter. It would also be desirable to provide a float for a liquid level detection apparatus which presents an overall small diameter when slid along the pipe through a riser or aperture in the tank and then is capable of expanding or moving to a position creating large surface area displacement on the liquid surface.

SUMMARY OF THE INVENTION

The present invention is a pivotal float for a liquid level detection apparatus, such as a magnetostrictive wave guide liquid level detection apparatus.

The float is used with a liquid level detection apparatus including elongated tube containing liquid level detection means, the tube extending through a liquid surface and liquid in a tank, the float comprises:

a buoyant body slidable along the tube.

means, carried on the body, for supporting the body in a first axial position substantially in line with the tube and slidable along the tube, and for allowing the body to pivot to a second position about the tube buoyantly supported on a liquid surface.

Preferably, the second position of the float is substantially perpendicular to the first position. The buoyant body of the float is preferably formed, of first and second, spaced, buoyant body members. The pivot means, preferably includes first spacer means mounted along and connecting one side edge of the first and second body member, second spacer means mounted along and connecting opposed side edges of the first and second body member, and the first and second spacer means spaced longitudinally apart from each other to allow the first and second body members to move to the first position axially concentric with the tube.

The spacer means preferably comprises the first spacer means in the form of a first pair of separate, spaced pins extending between and joined to the first and second body members; and the second spacer means includes a second pair of separate, spaced pins extending between and joined to the first and second body member. One pin of each of the first and second pairs of pins is spaced apart from an opposed pin of the other of the first and second pairs of pins to define an aperture for receiving the tube therethrough when the buoyant body is in the second position.

Where the liquid level detection apparatus is a magnetostrictive wave guide apparatus including the magnetostrictive wire extending through the tube, a magnet is fixably mounted in at least one, and preferably both of the first and second bodies of the buoyant bodies.

Means are carried on the buoyant body adapted for engagement with a separate removing member, such as a hook for pivoting the body from the second position to the first position. In a preferred embodiment, the removing means comprises a pin extending from at least one and preferably between both of the first and second buoyant members. The pin is preferably disposed between the pins in one of the pair of pins disposed lowermost when the float is in the second, operative float position.

The spacer means may also comprise relatively solid webs integrally formed with or joined to opposed side edges of the first and second members. Apertures may be formed in the webs for liquid drainage. Alternately, the spacer means may comprise two pairs of planar members having open-ended slots formed therein, with both slots in the pairs of planar members extending in opposite directions to axially mount the float about a tube and permit axial sliding movement of the float along the length of the tube while at the same time permitting the float to pivot relative to the tube between the innermost planar members to the second, operative floating position on a liquid surface.

The unique pivotal float of the present invention enables a small diameter float to be inserted through a small diameter riser or aperture in a tank while at the same time being movable to an operative, float position displacing a large surface area on the liquid surface to prevent bobbing or erratic movements of the float which could interfere with liquid level measurement. The float is of simple construction and may be provided in different configurations for use with many different liquid level detection apparatus, and, in particular, magnetostrictive waveguide liquid level detection apparatus.

BRIEF DESCRIPTION OF THE DRAWINGS

The various features, advantages and other uses of the present invention will become more apparent by referring to the following detailed description and drawing in which.

DESCRIPTION OF THE PREFERRED EMBODIMENTS

Referring now to the drawing and to FIGS. 1–9 in particular, there is depicted one embodiment of a float 10 constructed in accordance with the teachings of the present invention. The float 10 is capable of floating on a liquid surface 12 in a liquid containing tank 14 and is slidably movable along a tubular member or pipe 16 which forms part of a liquid level detection apparatus.

Figure 1:
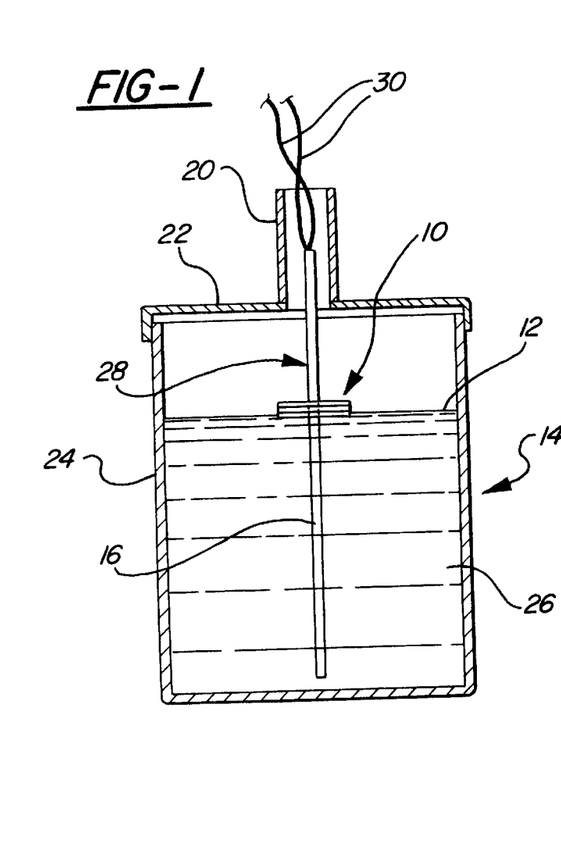
FIG. 1 is a partially cross-sectioned, side elevational view of a float constructed in accordance to the teachings of the present invention and mounted on a liquid level detection apparatus in a liquid tank.

A riser 20 is mounted on a top cover 22 of the tank 14. The cover 22 is sealingly mounted on the sidewalls 24 of the tank 14. The riser 20 is hollow and extends upward generally to ground level to provide access to the interior of the tank 14 for the supply of liquid 26 to the tank 14 and/or the discharge of liquid from the tank 14. Although not shown, the conventional filler liner, including a check valve and a fuel nozzle connection fitting, may be mounted within the riser 20.

Pipe 16 is part of a liquid level detection apparatus 28 which is capable of detecting the position of the float 10 and thereby the level of the surface 12 of the liquid 26 in the tank 14. Various liquid level detection apparatus are usable with the present float 10 including a conventional magnetostrictive-based liquid level apparatus disclosed in the aforementioned pending U.S. patent application Ser. No. 08/848,891, the contents of which pertaining to the construction and operation of the magnetostrictive sensor and processing circuit are incorporated herein by reference.

In this patent application, the liquid level detection components and circuitry 28 are contained completely within the pipe 16, with only a pair of leads 30 extending outward from the upper end of the pipe 16 for connection to suitable processing equipment, not shown. This enables the small diameter pipe 16 to be easily inserted through small diameter risers 20, such as risers 20 having an inner diameter of approximately 2 inches; while still providing adequate room around the pipe 16 for the insertion of a fuel nozzle into the riser 20.

However, it will be understood other liquid level detection apparatus or magnetostrictive waveguide apparatus may also be employed with the present float, including magnetostrictive waveguide apparatus which have a large diameter head containing processing circuit and other elements as disclosed in the background patents described above.

Specifically, it will be understood that the float 10 of the present invention may be employed with any type of liquid level detection apparatus regardless of the construction of the apparatus, or its size relative to the size of the tank or riser in which it is mounted.

As shown in FIGS. 2–7, the float 10, in one embodiment, is in the form of a buoyant body which may be constructed of buoyant material or with a construction which provides buoyancy such that the float 10 is capable of floating on the surface 12 of the liquid 26 in the tank 14.

Thus, the float 10 may be formed of a buoyant material, such as foam, polyurethane, etc. Alternately, the float 10 could be formed with a buoyant construction such as closed, hollow, tubular members. Such hollow members may be formed of metal, blow molded plastic, etc.

Figure 2:
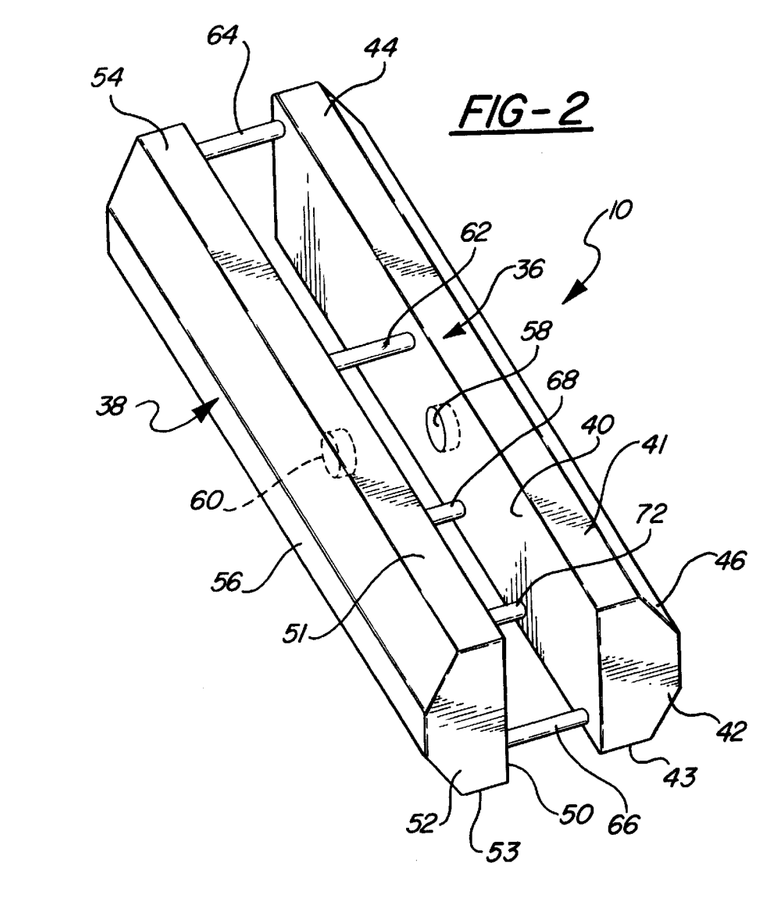
FIG. 2 is a perspective view of one embodiment of the float depicted in FIG. 1.

Shown in FIG. 2, the float 10, in one embodiment, is formed of first and second float bodies 36 and 38. The float bodies 36 and 38, as described above, may be formed of any suitable buoyant material or constructed as hollow, tubular members which have buoyant characteristics.

In this embodiment, the float body 36 has a generally planar first side surface 40, opposed first and second ends 42 and 44, and an outer surface 46 defined by any suitable cross section with first and second opposed side edges 41 and 43. Similarly, the second float body 38 has a generally planar side surface 50 spaced from and preferably parallel to the side surface 40 of the first float body 36. The second float body 38 also has first and second opposed ends 52 and 54 and an outer surface 56 defined by any cross section, preferably identical to the cross section of the first float body 36, and having edges 51 and 53.

In FIG. 2, the cross section of the first and second float bodies 36 and 38 is depicted, by example only, as formed of a plurality of angularly disposed flats. It will be understood, however, that the cross section of each of the first and second float bodies 36 and 38 may take any other form, such as smoothly curved, semi-circular cross sections, polygonal cross sections including square, rectangular, heptagonal, etc. The main requirement is that each of the first and second float bodies 36 and 38 contain sufficient material or have a sufficient exterior surface area to provide adequate buoyancy.

At least one and preferably two magnets 58 and 60 are respectively mounted in the first and second float bodies 36 and 38 generally centrally located between the opposed first and second ends 42 and 44 of the first float body 36 and the first and second ends 52 and 54 of the second float body 38. The magnets 58 and 60 interact with the magnetostrictive wire in the pipe 16 as is conventional in magnetostrictive waveguide liquid level detections apparatus.

The magnets 58 and 60 may be mounted in the first and second float bodies 36 and 38 by suitable means including adhesively mounting each of the magnets 56 and 58 in a shallow recess formed on the planar surfaces 40 and 50 of the first and second float bodies 36 and 38, respectively. Alternately, the first and second magnets 58 and 60 may be insert molded in each of the first and second float bodies 36 and 38 when the first and second float bodies 36 and 38 are formed of a moldable plastic or other material.

Alternately, a metal mass may be mounted in each of the first and second float bodies 36 and 38 in place of the magnets 58 and 60 where the liquid level detection apparatus utilizes an inductive or capacitive sensor.

According to a unique feature of the present invention, the float 10 includes means for axially supporting the float 10 on the pipe 16 for axial sliding movement of the float 10 along the length of the pipe 16 during insertion and removal of the float with respect to the tank 14, and for enabling movement of the float 10 from the aforesaid axial position generally in line with the pipe 16 to a float position on the surface 12 of liquid 26 in tank 14, and for maintaining the float 10 about the pipe 16 while the float 10 floats on the surface 12 of the liquid 26 in the tank 14.

In one embodiment, the supporting means comprises two pairs of pins, with the first pair of pins including a first pin 62 and a second pin 64. A second pair of pins formed of pins 66 and 68 are also carried or formed on the float 10.

Figure 3:
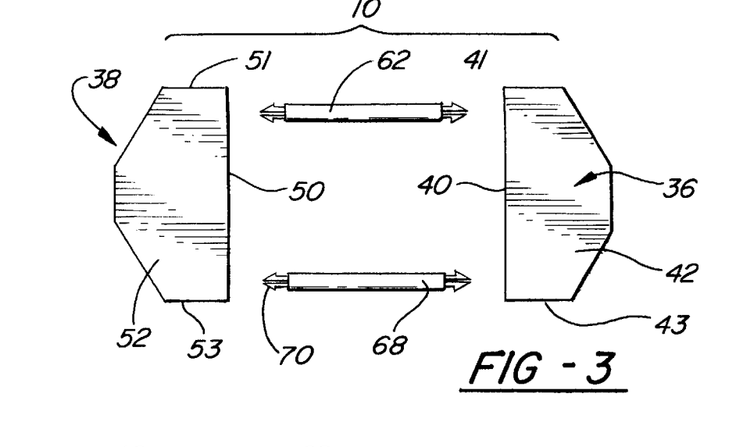
FIG. 3 is an exploded, end view of the float shown in FIG. 2.

The pins 62, 64, 66 and 68 may be in the form of separate elements as shown in FIG. 3 which are joined to the first and second float bodies 36 and 38 by means of pointed end tabs 70 which are pressable into the first and second float bodies 36 and 38 or slidable into preformed bores 71 in the float bodies 36 and 38. Alternately, the pins 62, 64, 66, 68 may be fixedly mounted to the first and second float bodies 36 and 38 by other fastening means, including welding, threaded connections, etc. The pins 62, 64, 66, 68 may also be integrally formed or molded with the first and second float bodies 36 and 38 where the first and second float bodies 36 and 38 are formed of a moldable material, such as plastic.

Figure 4:
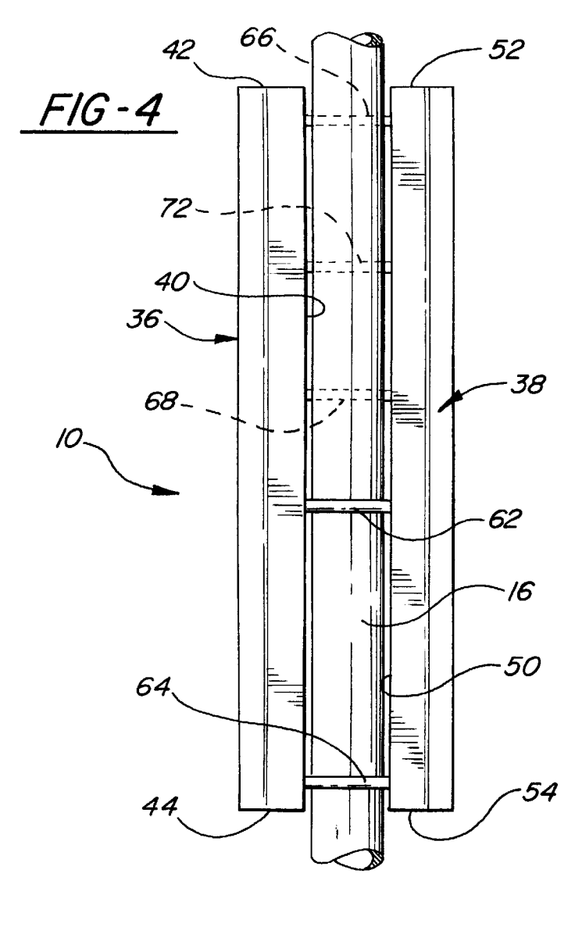
FIG. 4 is a side elevational view showing the tank insertion position of the float of FIG. 2 on a liquid level detection pipe.
Figure 5:
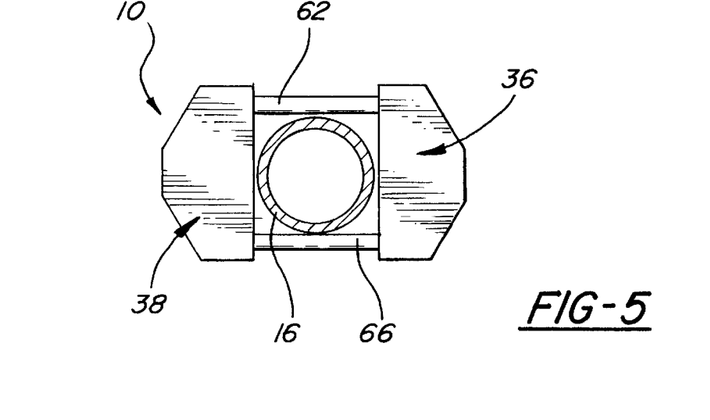
FIG. 5 is an end view of the float of the pipe.

The use of separate pins which are pressed or otherwise fixedly mounted into the first and second float bodies 36 and 38 enables the float 10 to be mounted about a pipe 16 below any enlarged head which may be mounted on the end of the pipe 16 while still providing the desired supporting and pivoting functions described above. The first pair of pins 62 and 64 are fixed to the planar surfaces 40 and 50 of the first and second float bodies 36 and 38 at locations close to the side edges 41 and 51 of the first and second float bodies 36 and 38 as shown in FIGS. 2 and 3. The second pair of pins 66 and 68 are fixed to the first and second float bodies 36 and 38 at locations adjacent to the opposed side edges 43 and 53 of the first and second float bodies 36 and 38. This arrangement of the pins 62, 64, 66, and 68 forms an opening extending axially between the opposed ends 43 and 53, and 44 and 54 of the first and second float bodies 36 and 38, as shown in FIGS. 4 and 5, to enable axially sliding movement of the float 10 along the length of the pipe 16 to insert the float 10 into the tank 14 or to remove the float 10 from the tank 14. As shown in FIG. 4, when the float 10 is mounted about the pipe 16, the first pair of pins 62 and 64 are disposed on one side of the pipe 16; while the second pair of pins 66 and 68 are disposed on the other side of the pipe 16.

As also shown in FIGS. 4 and 5, when the float 10 is axially disposed concentrically about the pipe 16 during insertion or removal movements, the overall outer diameter of the float 10 is slightly less than the inner diameter of the riser 20 to permit the float 10 to be inserted through the riser 20 or removed from the tank 14 through the riser 20 after the pipe 16 has been mounted in the riser 20 and the tank 14.

Figures 6, 7, 8:
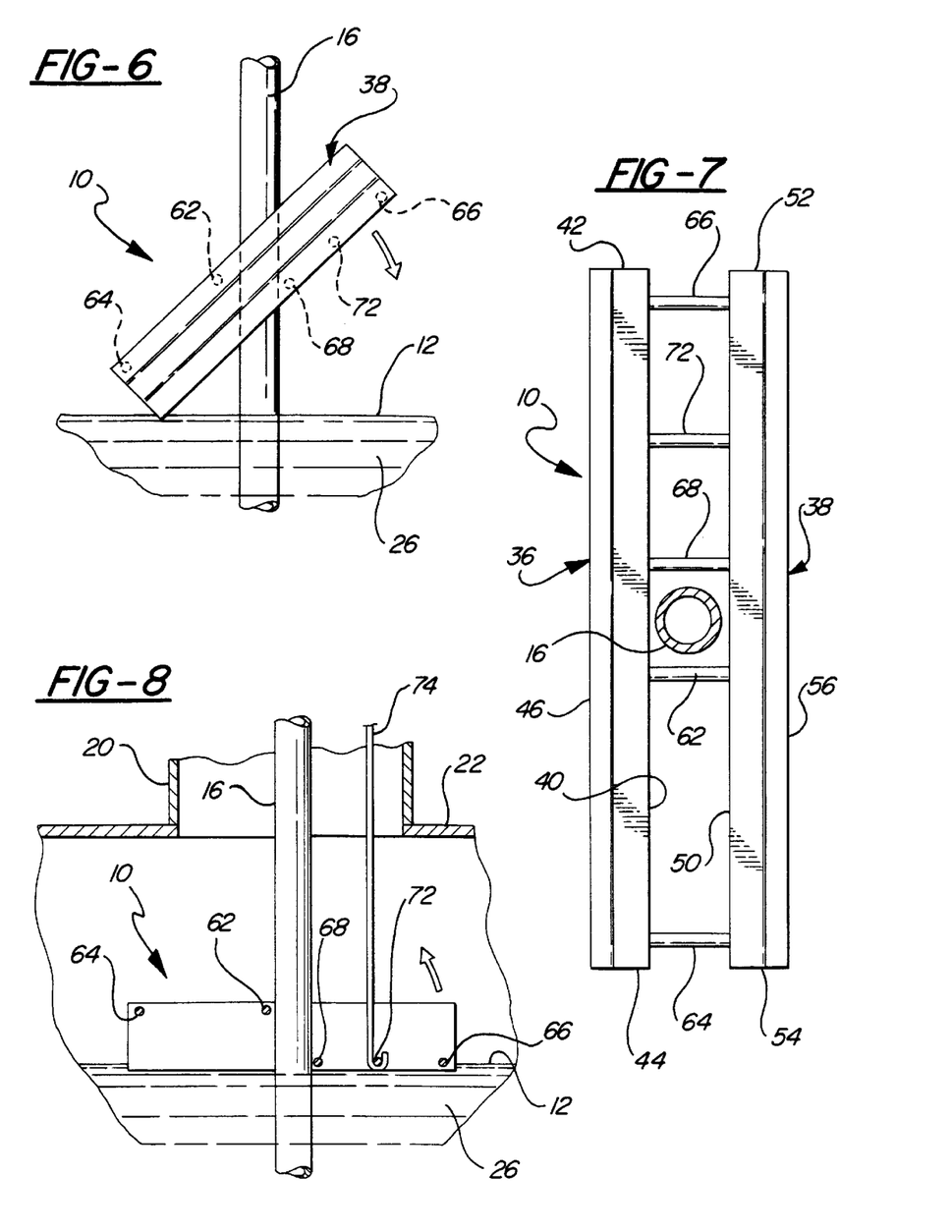
FIG. 6 is a side elevational view depicting the pivotal movement of the float with respect to the pipe.
FIG. 7 is a plan view of the float and pipe depicted in FIG. 4.
FIG. 8 is a partially cross sectioned, side elevational view showing the first step in removing the float from the liquid tank.

The inner pins 62 and 68 of the two pair of pins also define a loose pivot means which permits the float 10 to pivot from the first, axial sliding position shown in FIG. 4 to a generally perpendicular, second, floating position with respect to the pipe 16 when the float 10 contacts the surface 12 of the liquid 26 in the tank 14. When one end of the float 10 contacts the liquid surface 12 as shown in FIG. 6, the float 10 will naturally pivot between the pin 62 and 68 about the pipe 16 bringing the opposed ends 43 and 53 of the first and second float bodies 36 and 38 downward in the direction of the arrow shown in FIG. 6 toward the liquid surface 12. In this floating position, the float 10 is oriented substantially perpendicular to the longitudinal axis of the pipe 16 as shown in FIG. 8. Further, the pins 62 and 68, in the second, floating position of the float 10 also retain the float 10 in a relative position about the pipe 16, since the pipe 16 extends through the opposed pins 62 and 68. However, the float 10 is capable of slight movements relative to the pipe 16 and can even rotate completely about the longitudinal axis of the pipe 16.

The staggered mounting of the first pair of pins 62 and 64 along the side edges 41 and 51 of the first and second float bodies 36 and 38 and the second pair of pins 66 and 68 along the opposed side edges 43 and 53 of the first and second float bodies 36 and 38 openings between the first and second float bodies 36 and 38 along the side edges opposite from each pair of pins 62 and 64, and 66 and 68. This enables the float 10 to exhibit the pivotal movement described above relative to the pipe 16.

Figure 9:
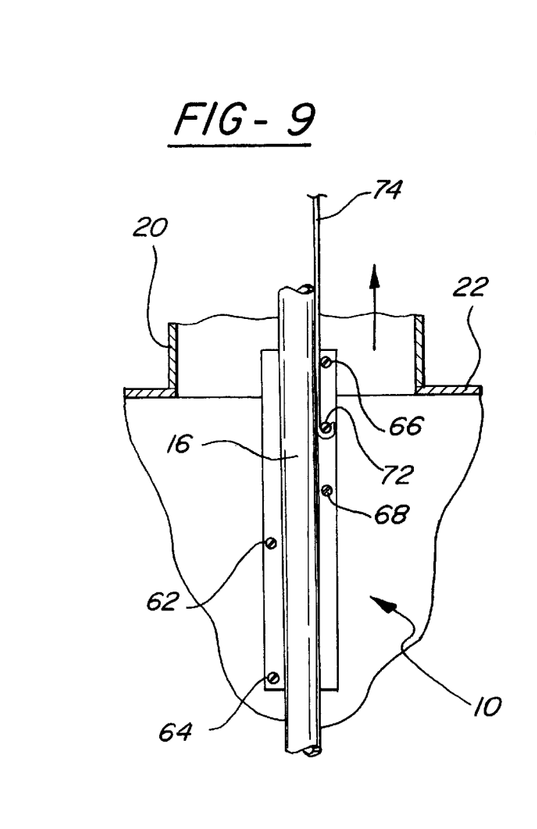
FIG. 9 is a side elevational view, with on body member of the float removed to show the removal position of the float on the pipe.

Unique means are also provided for pivotally moving the float 10 from its operative float position, generally perpendicular to the pipe 16 to the first axial position shown in FIG. 9 to permit removal of the float 10 from the interior of the tank 14 through the riser 20 as shown in FIGS. 8 and 9. A removal means, in one embodiment, comprises a removal pin 72 which is constructed similar to the pins 66 and 68 and is mounted in the same manner as the pins 66 and 68 adjacent to the side edges 43 and 53 of the first and second float bodies 36 and 38 close to, but spaced from the pin 68 as shown in FIGS. 2, 4 and 6–9. The removal pin 72 is mounted close to the pin 68 to permit a removal means, such as an elongated hook 74, to be inserted through the riser 20 into engagement with the removal pin 72 as shown in FIG. 8. Upward pulling movement of the hook 74 in the direction of the arrow in FIG. 8 causes the float 10 to pivot between the pins 62 and 68 relative to the pipe 16 to the axial position shown in FIGS. 4 and 9. In order to insure that the hook 74 is capable of engaging the removal pin 72, the entire pipe 16 is preferably moved to one side of the riser 20 as shown in FIG. 8.

Continued upward force on the hook 74 in the direction of the arrow in FIG. 9 holds the float 10 in its axial position about the pipe 16 to thereby enable the entire float 10 to be slid through the small diameter riser 20 and removed from the interior of the tank 14 while the pipe 16 still remains in the tank 14.

Figure 10:
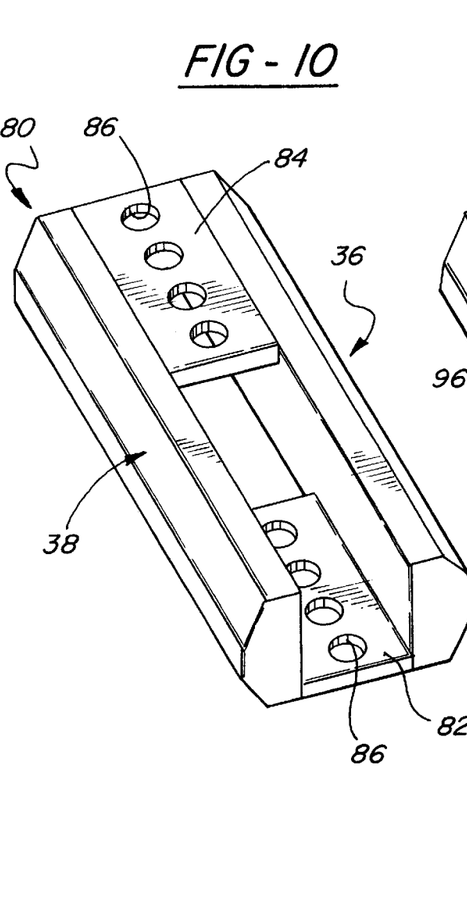
FIG. 10 is a perspective view of another embodiment of a float constructed in accordance with the teachings of the present invention.

Another embodiment of a float of the present invention is shown in FIG. 10. In this embodiment, a float 80 is formed of the first and second float bodies 36 and 38, as described above. First and second webs 82 and 84 are joined to or integrally formed with the first and second float bodies 36 and 38 and are disposed generally along opposed side edges of the float bodies 36 and 38 as shown in FIG. 10. The inner ends of the first and seconds webs 82 and 84 are spaced apart to define a transverse opening for the pipe 16 when the float 80 is in the second floating position. Since the first and second webs 82 and 84 are disposed along opposite side edges of the first and second float bodies 36 and 38, the float 80 is capable of axial sliding movement along the length of the pipe 16 for insertion or removal of the float 10 into or out the tank 14 as well as pivotal movement into a floating position in the same manner as the float 10 described above and shown in FIGS. 1–9.

A plurality of apertures 86 may be formed in the first and second webs 82 and 84 to permit drainage of any liquid which may be trapped between the first and second float bodies 36 and 38. The apertures 86 also provide a location for engagement of the hook 74 to pivot the float 80 from the floating position back to an axial position concentric with the pipe 16 for removal of the float 80 from the tank 14.

Rather than utilizing the apertures 86 as an engagement means for the hook 74, a separate lip or pin mounted in a recess on the inner surface of the web 82 may be provided as an engagement point for the hook 74.

The webs 82 and 84, instead of having a flat shape as shown in FIG. 10, may also have a shape which forms continuations of the float bodies 36 and 38, such as a circular cross-section. This construction, as well as the construction shown in FIG. 10 forms open ended slots between the float bodies 36 and 38 extending from opposite ends of the float bodies 36 and 38 to provide the pivot movement of the float 80 between the first and second positions relative to the pipe 16.

Figure 11:
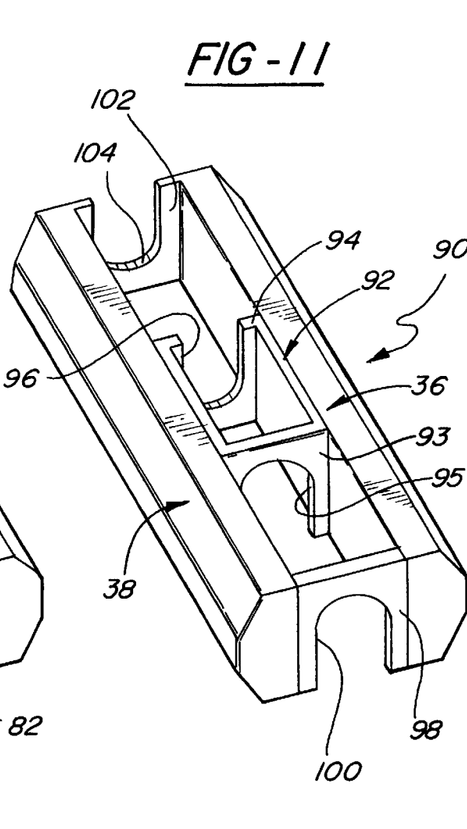
FIG. 11 is a perspective view of yet another embodiment of a float according to the present invention.

FIG. 11 depicts yet another embodiment of a float 90 which is also formed of first and second float bodies 36 and 38. In this embodiment, the supporting means comprises a center box member 92 having opposed end walls 93 and 94 each with an open-ended slot 95 and 96 extending from opposite end walls in opposite directions. It will be understood that the end walls 93 and 94 may simply be separate members fixed to the first and second float bodies 36 and 38. The center box member 92 is likewise affixed to the first and second float bodies 36 and 38 by suitable means, such as adhesive, fasteners, etc.

A first end member 98 with an open ended slot 100 is fixably mounted at one end of the first and second float bodies 36 and 38. A second end member 102, also with an open ended slot 104, is fixably mounted at an opposite end of the first and second float bodies 36 and 38. The slots 100 and 104 in the end members 98 and 102 respectively, open in opposite directions as shown in FIG. 11 and generally extend in the same direction as the adjacent slots 95 and 96 in the end walls 93 and 94, respectively. In this manner, the aligned slots 100, 95, 96 and 104 form an opening for receiving the pipe 16 therethrough to axially, slidably mount the float 90 about the pipe 16 for sliding movement of the float 90 relative to the pipe 16 as described above. However, the closed ends of the center box 92 at one end of the slots 95 and 96 form pivot points which enables the float 90 to pivot from the axial position to the generally perpendicular, operative floating position in the same manner as the prior embodiments of the float described above.

In summary, there has been disclosed a unique float for a liquid level detection apparatus which is capable of movement relative to the conduit or tubular member of the liquid level detection apparatus from a first position axially in line with the conduit or pipe for insertion or removal of the float relative to the tank to a second, operative floating position generally perpendicular to the pipe when the float contacts the liquid surface in the tank. This unique construction enables a relatively small diameter float to be constructed for insertion into risers or apertures in tanks having a small diameter, such as approximately 2 inches while at the same time being pivotal to an operative position and forming a large surface contact area with the liquid for increased buoyancy and less bobbing or erratic movements on the liquid surface which could interfere with accurate liquid level measurements. The float of the present invention is usable with substantially all types of liquid level detection apparatus and, in particular, magnetostrictive waveguide liquid level detection apparatus. The float can be preassembled and inserted over the pipe of the liquid level detection apparatus or assembled about the pipe below any enlarged head which is found on the end of many magnetostrictive liquid level detection apparatus.

What is claimed is:

1. A float for a liquid level detection apparatus including elongated tube containing liquid level detection means, the tube extending through a liquid surface of liquid in a tank, the float comprising:
   a buoyant body adapted to be slidable along the tube; and
   means, carried on the body, for supporting the body in a first axial position substantially in line with the tube and slidable along the tube, and for allowing the body to automatically pivot under buoyant forces generated through contact with a surface of a liquid in a tank to a second position about the tube buoyantly supported on a liquid surface in a tank.

2. The float of claim 1 wherein the second position of the buoyant body is substantially perpendicular to the first position.

3. The float of claim 1 wherein the buoyant body comprises:
   first and second axially spaced buoyant bodies.

4. A float for a liquid level detection apparatus including elongated tube containing liquid level detection means, the tube extending through a liquid surface of liquid in a tank, the float comprising:
   a buoyant body adapted to be slidable along the tube, the buoyant body including first and second axially spaced bodies; and
   means, carried on the first and second bodies, for supporting the first and second bodies in a first axial position substantially in line with the tube and slidable along the tube, and for allowing the first and second bodies to pivot to a second position about the tube buoyantly supported on a liquid surface in a tank, the supporting means including:
      first spacer means for connecting one side edge of the first and second bodies;
      second spacer means for connecting opposed side edges of the first and second bodies; and
      the first and second spacer means spaced longitudinally apart from each other to allow the first and second bodies to move to the first position axially concentric with the tube.

5. The float of claim 4 wherein:
   the first spacer means includes a first pair of separate, spaced pins extending between and joined to the first and second bodies; and
   the second spacer means includes a second pair of separate, spaced pins extending between and joined to the first and second bodies.

6. The float of claim 5 wherein:
   one pin of one of the first and second pairs of pins is spaced apart from one pin of the other of the first and second pairs of pins to define an aperture adapted to receive a tube therethrough when the buoyant body is in the second position.

7. The float of claim 5 wherein:
   the first and second pairs of pins are integrally formed as a one-piece member with the first and second members.

8. The float of claim 5 further comprising:
   means, carried on at least one of the first and second bodies, adapted for engagement with a separate removing member for pivoting the first and second bodies from the second position to the first position.

9. The float of claim 8 wherein the pivoting means comprises:
   a pin extending from at least one of the first and second bodies toward the other of the first and second bodies, the pin disposed between the first and second pins of one of the pairs of pins.

10. The float of claim 9 wherein:
    the pin is mounted between the first and second pins of the pair of pins disposed lowermost when the buoyant body is in the second position.

11. A float for a liquid level detection apparatus including elongated tube containing liquid level detection means, the tube extending through a liquid surface of liquid in a tank, the float comprising:
    a buoyant body adapted to be slidable along the tube, the buoyant body including first and second axially spaced bodies;
    means, carried on the body, for supporting the body in a first axial position substantially in line with the tube and slidable along the tube, and for allowing the body to pivot to a second position about the tube buoyantly supported on a liquid surface in a tank; and
    a magnet mounted in the buoyant body.

12. The float of claim 3 further comprising:
    a magnet mounted in at least one of the first and second bodies.

13. A float for a liquid level detection apparatus including elongated tube containing liquid level detection means, the tube extending through a liquid surface of liquid in a tank, the float comprising:
    a buoyant body adapted to be slidable along the tube, the buoyant body including first and second axially spaced bodies;
    means, carried on the body, for supported the body in a first axial postion substanially in line with the tube and slidable along the tube, and for allowing the body to pivot to a second position about the tube buoyantly supported on a liquid surface in a tank; and
    means, carried on the body adapted for engagement with a separate removing member, for pivoting the body from the second postion to the first postion.

14. A float for a liquid level detection apparatus including elongated tube containing liquid level detection means, the tube extending through a liquid surface of liquid in a tank, the float comprising:
    a buoyant body adapted to be slidable along the tube, the buoyant body including first and second axially spaced bodies; and
    means, carried on the body, for supporting the body in a first axial position substantially in line with the tube and slidable along the tube, and for allowing the body to pivot to a second position about the tube buoyantly supported on a liquid surface in a tank, the means for supporting and allowing pivotal movement of the body between the first and second positions integrally formed as a one piece member of the body.

15. A float in the form of a magnetostrictive waveguide apparatus for a liquid level detection apparatus including elongated tube containing liquid level detection means, the tube extending through a liquid surface of liquid in a tank, the float comprising:
    a buoyant body adapted to be slidable along the tube, the buoyant body including first and second axially spaced bodies;
    means, carried on the body, for supporting the body in a first axial position substantially in line with the tube and slidable along the tube, and for allowing the body to pivot to a second position about the tube buoyantly supported on a liquid surface in a tank; and the magnetostrictive waveguide apparatus including:
  a magnetostrictive wire fixably mounted within the tube;
  pick up means, coupled to the magnetostrictive wire, for outputting signals propagating along the wire; and
  circuit means for coupling electrical signals to the magnetostrictive wire and the pick up means and for transmitting electric signals from the magnetostrictive wire and the pick up means.

16. A float for a liquid level detection apparatus including elongated tube containing liquid level detection means, the tube extending through a liquid surface of liquid in a tank, the float comprising:
  a buoyant body adapted to be slidable along the tube, the buoyant body including first and second axially spaced bodies; and
  means, carried on the body, for supporting the body in a first axial position substantially in line with the tube and slidable along the tube, and for allowing the body to pivot to a second position about the tube buoyantly supported on a liquid surface in a tank, the supporting means including:
    a first pair of spacer members, each having an open ended slot formed therein, the first and second end members mounted between the first and second bodies with the slots in the first and second end members extending in the same direction;
    a second pair of end members, each having an open ended slot formed therein, the second pair of end members mounted between the first and second bodies with the slots extending in an opposite direction from the slots in the first pair of end members; and
    the first and second pairs of end members spaced longitudinally from each other such that the axially aligned slots in the first and second pairs of end members are adapted for receiving a tube therebetween to axially mount the first and second bodies about the tube while permitting pivotal movement of the body to the second position between the innermost opposed end members of the first and second pairs of end members.

17. A float for a liquid level detection apparatus including elongated tube containing liquid level detection means, the tube extending through a liquid surface of liquid in a tank, the float comprising:
  a buoyant body adapted to be slidable along the tube, the buoyant body including first and second axially spaced bodies; and
  means, carried on the body, for supporting the body in a first axial position substantially in line with the tube and slidable along the tube, and for allowing the body to pivot to a second position about the tube buoyantly supported on a liquid surface in a tank, the supporting means including:
    first and second webs respectively joined to and extending between opposed side edges of the first and second bodies;
    innermost ends of the first and second webs spaced longitudinally apart to define an aperture extending transversely between the first and second bodies for receiving a pipe therethrough when the first and second bodies are in the second, floating position.

18. The float of claim 17 wherein:
  the first and second webs are formed as integral, continuous extensions of the first and second bodies.

19. A float for a liquid level detection apparatus including elongated tube containing liquid level detection means, the tube extending through a liquid surface of liquid in a tank, the float comprising:
  a buoyant body adapted to be slidable along the tube, the buoyant body including first and second axially spaced bodies; and
  means, carried on the body, for supporting the body in a first axial position substantially in line with the tube and slidable along the tube, and for allowing the body to pivot to a second position about the tube buoyantly supported on a liquid surface in a tank;
  the buoyant body including:
    first and second slots extending from opposed ends of the body and diametrically opposed on the body;
    inner ends of the first and second slots spaced from the ends of the body aligned to define a transverse aperture through the body for receiving a pipe therethrough when the body is in the second, floating position while allowing the body to pivot between the first and second positions.

* * * * *